Dec. 31, 1957 H. E. TAUTZ 2,818,141
SHOCK ABSORBER RESERVOIR VALVES
Filed March 3, 1954
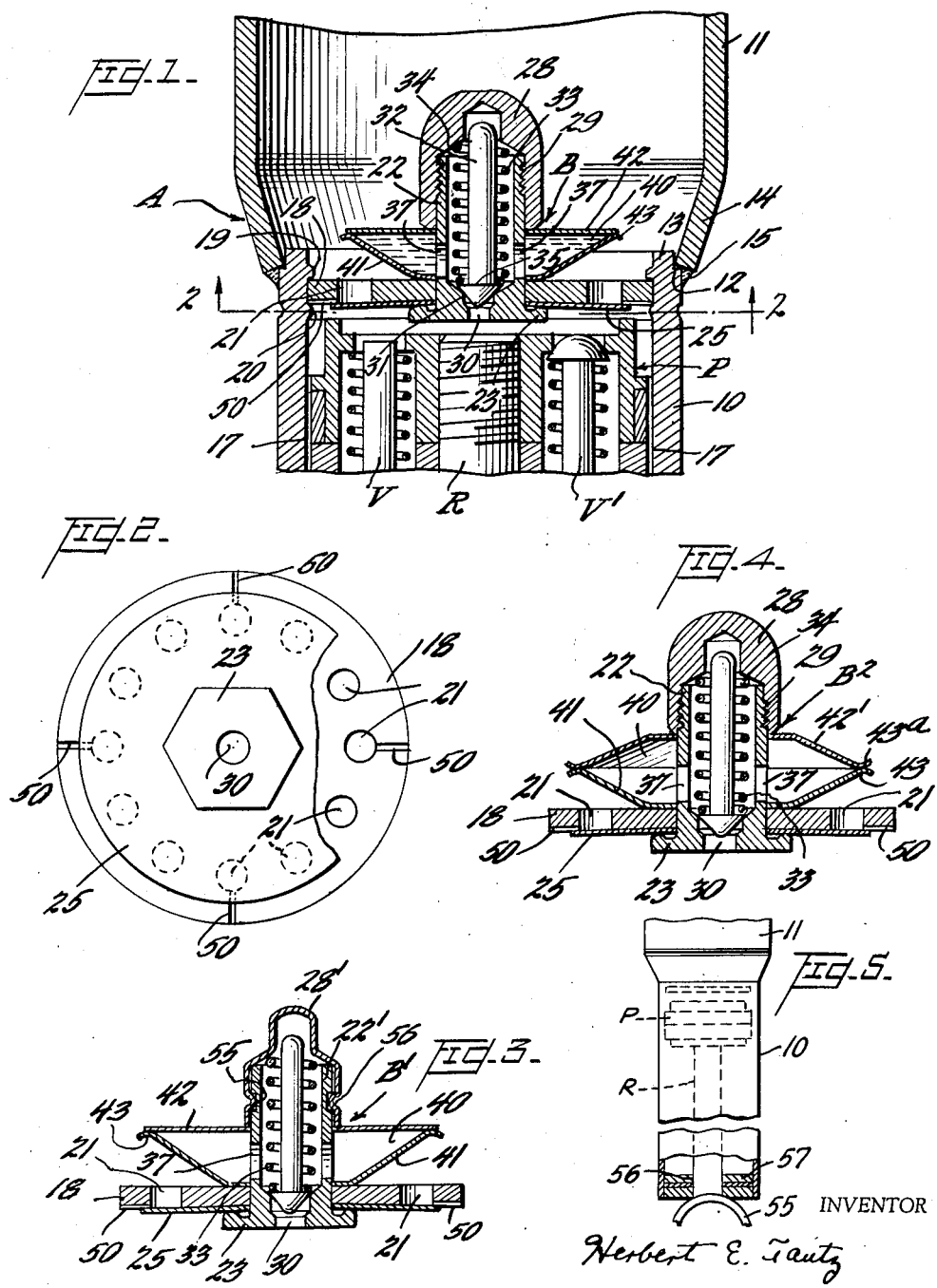
INVENTOR
Herbert E. Tautz
BY Watson, Cole, Grindle & Watson
ATTORNEYS

United States Patent Office 2,818,141
Patented Dec. 31, 1957

2,818,141

SHOCK ABSORBER RESERVOIR VALVES

Herbert E. Tautz, Denver, Colo., assignor, by mesne assignments, to Christian Marie Lucien Louis Bourcier de Carbon, Neuilly-sur-Seine, France Application March 3, 1954, Serial No. 413,852

5 Claims. (Cl. 188—100)

This invention relates to shock absorbers and more particularly to shock absorbers of the direct-acting fluid-displacement type adapted especially though not exclusively for use on automotive vehicles.

The general object of the invention is the provision of novel and improved fluid transferring devices disposed between the working chamber of a shock absorber of the class described and the reservoir or cavitation chamber thereof.

The principles of the invention are particularly applicable to shock absorbers of the type disclosed in the co-pending application of De Carbon Serial No. 145,788, filed February 23, 1950, now United States Patent 2,719,612, granted October 4, 1955, and the parent applications of which that application is a continuation-in-part. Reference is also made to the co-pending application of De Carbon Serial No. 252,488, filed October 22, 1951, now United States Patent 2,757,762, granted August 7, 1956, for the disclosure of fluid valving and baffling means aimed at the solution of problems similar to those attacked by the present conception.

It will be understood from a perusal of the above mentioned applications that the general type of shock absorber to which this invention relates, involves the provision of a fluid chamber disposed in the casing at a position above the working chamber in which the piston reciprocates, this expansion or reserve chamber being adapted to contain a supply of working fluid held in ready availability for keeping the working chamber full of liquid at all times, thus preventing the formation of voids or air pockets, which would seriously interfere with the efficient operation of the shock absorber. Also, as is well known in the art, the piston rod as it enters the working chamber displaces liquid therefrom, and thus the expansion chamber serves to accommodate this displaced fluid, receiving it through certain spring-resisted valving means, and readily giving it up to the working chamber, upon retraction or withdrawal of the piston rod, through valving of very slight resistance. The valving for both directions of flow is appropriately selected or adjusted with relation to the rate of displacement of liquid past the piston so as to prevent cavitation at any expected piston velocity.

Obviously, the reservoir chamber also takes care of any thermal expansion of the body of working fluid.

One distinctive feature of the shock absorbers disclosed in the prior applications to which reference has been made, is the attachment of the cylinder or working chamber of the shock absorber to the body or chassis of the vehicle and the piston rod to the wheel mounting. This arrangement ensures that the body of liquid carried in the cylinder is supported by the sprung weight and is therefore not subjected to the continual and sometimes violent vibrations of the unsprung wheel and axle assemblies. This provision prevents emulsification and foaming of the working liquid to a large extent, and it is another object of the present invention to provide certain baffle and ejector features which will further aid in maintaining the body of liquid especially within the reservoir at the top of the working cylinder and adjacent the surface of the liquid, in a relatively quiescent state and free from excess turbulence or splashing.

The liquid level is maintained at the highest practical point within the reservoir leaving a small volume of air at the very top of the chamber, which volume of air naturally varies during operation.

As already stated, one of the problems involved in designing an efficient shock absorber of this type is that of reducing foaming or the formation of emulsion to an absolute minimum. Foaming is generally caused by any sharp jetting of working fluid into the cavitation chamber or reservoir, and especially through the liquid contained therein to the upper surface.

Thus it has been found that foaming can be reduced by directing the jetting of the fluid from the working chamber radially outwardly within the cavitation chamber, as explained in the De Carbon applications referred to, and also in accordance with the present invention by providing an outlet for the discharge of this fluid of a substantially continuous annular or circular extent, thus reducing the velocity of the emitted liquid as compared with the velocity of the same liquid through the initial valve passageways of the partition assembly which separates the two chambers.

In its preferred embodiments, the invention contemplates the provision of means for loosely impounding a portion of the working fluid at a point immediately beyond the outlet of the valving through which said fluid is ejected from the working cylinder into the cavitation chamber upon added increments of the piston rod volume entering the working chamber. The issuance of this impounded fluid into the cavitation chamber proper is impeded only slightly by further resilient spring valving means. This light or gentle valving arrangement comprises discs or dished sheet metal plates which bound the sub-chamber in which the impounded fluid is held, and the margins of these discs are in lip contact whereby the entire periphery of the mating discs opens up to provide an outlet means of great capacity.

Other objects and features of novelty, including improved ways and means for assembling the various parts of the device, will be apparent from the following specification, when read in connection with the accompanying drawings in which certain embodiments of the invention are illustrated by way of example.

In the drawings:

Figure 1 is a fragmentary view in vertical section of the upper end portion of a shock absorber containing a partition and baffle assembly embodying the principles of the invention;

Figure 2 is a bottom plan view of the cavitation valving partition and assembly as seen approximately from line 2—2 of Figure 1;

Figure 3 is a vertical sectional view of a modified form of partition and baffle assembly;

Figure 4 is a further example of a partition and baffle assembly coming within the scope of the invention; and Figure 5 is a diagrammatic view on a reduced scale and partly in section showing the lower end of the shock absorber.

Referring first to Figure 1 of the drawings for an understanding of the type of shock absorber to which the invention relates, it will be seen that the shock absorber casing is designated generally by the reference character A and is similar in general configuration and function to those disclosed in the co-pending De Carbon applications referred to above. The substantially cylindrical side wall portion of the casing is indicated at 10 and this is surmounted by cap or dome-like end structure 11. Various means for uniting these two parts of the casing or housing may be resorted to, but the preferred arrangement is as illustrated in Figure 1, where the upper end of the cylindrical portion 10 is shouldered at 12 leaving an upwardly projecting flange 13 of somewhat less thickness than the main portion of the cylinder. The lower flanges of the cap or dome 11 are swaged inwardly as at 14 and their lower edges are seated upon the shouldered portion 12 of the cylinder. The cap or dome is then rigidly united with the cylindrical body portion of the casing by means of the annular welding 15. By this means a firmer union is attained by virtue of the fact that the welded parts 10 and 14 are of substantially full thickness at the point of welding and do not comprise thin flanges which might be weakened by the heat of welding.

As in the case of the other shock absorbers of this line of development the domed portion 11 encloses at least the greater portion of the damping fluid reservoir or so-called cavitation chamber, into which the fluid is forced upon entry of successive additional portions of the piston rod upon the occurrence of the compression stroke and from which the fluid is withdrawn upon the recession of the piston rod upon the rebound stroke.

So far as the present invention is concerned, the shock absorber piston may be of any practical type and only a portion of it is shown here, the piston being described in detail in the co-pending applications referred to. In Figure 1 the piston is given the general reference character P, and to the axial portion of the piston P there is threaded the piston rod R. Valves V and V' are employed for permitting by-pass flow of the fluid through the piston upon the occurrence of excessive shock, and the piston proper is separated from the inner wall of the cylinder 10 by the minute laminar clearance space 17.

The partition assembly which separates the working chamber enclosed by the cylindrical portion 10 and the cavitation chamber within the dome 11, is designated generally by the reference character B and comprises primarily the partition plate 18 which is seated snugly within the upper end of the cylinder 10 and held in place by a series of spaced protuberances or abutments 19 above the plate and a series of staked protuberances 20 below the plate. The partition 18 is provided with an annular series of openings 21 through which liquid may return from the cavitation chamber to the working chamber upon occurrence of the rebound or return stroke of the piston. Through an opening extending axially of the plate 18 there is forced the hollow stem member 22 which is headed as at 23 to overlie the margins of a central opening in a spring disc valve 25 and thus clamp the valve against the undersurface of the plate 18. This surface is of a slightly concave configuration whereby the originally flat spring valve disc 25 is given an initial stress when the assembly is made. The valve disc 25 overlies the openings 21 and is very readily sprung away from the openings upon movement of the piston P downwardly within the cylinder so as to permit the ready return of the fluid to the working chamber as the piston rod R recedes from the working chamber through the bottom of the cylinder. The rod R passes through an opening 56 in the packing arrangement 57 comprising the bottom wall of the cylinder 10, and may be provided with a ring 55 for the purpose of securing it to one of the members the relative movement of which is to be damped.

The hollow stem 22 extends upwardly into the cavitation chamber and is surmounted by a cap 28 which is threaded upon the end of the stem as at 29. A central opening 30 is made in the lower head of the stem 22 to admit fluid forced upwardly through the partition upon the occurrence of the compression stroke of the piston. The upper portion of this opening is flared considerably and forms a valve seat 31 against which a rivet-shaped valve member 32 seats to control the upward passage of the fluid. A coil spring 33 seated against the shoulder 34 of the cap 28 and against the shoulder 35 of the conical head of the valve urges the valve downwardly to seated position. Two oppositely disposed lateral openings 37 are formed in the wall of the hollow stem 22 and fluid passing through the valved opening 30 is directed radially outwardly through these openings.

From that point onward the present invention provides a means for reducing the force of these lateral jets of fluid by confining a body of fluid from the openings 37 within the chamber 40 formed by a lower dished frusto-conical cup-like sheet metal plate 41 and an upper spring disc 42 whose margins bear against the curved lip 43 of the lower cup-like plate. These plates 41 and 42 have central openings which snugly surround the hollow stem 22 and are held in an initial contacting position by means of the lower end of the cap member 28. In the preferred embodiment of the invention, the lower cup-like member 41 is made of deep-drawn steel and the flat spring disc element 42 is made of spring steel. The gauge of the lower member 41 may be substantially the same as that of the valve 25 while the upper spring disc member 42 is preferably of approximately half that thickness.

The result of the above provisions will be readily perceived. Upon movement of the piston P upwardly within the working chamber, fluid will be forced through the opening 30 past the valve seat 31 with considerable jetting force and thence through the lateral openings 37 with somewhat diminished force but still with sufficient jetting effect to retain the possibility of foaming. However, this high velocity of the oil entering the sub-chamber 40 will be reduced or retarded and when the pressure overcomes the initial tension of the spring disc 42 the latter will lift very slightly and the oil will emerge quite gently into the cavitation chamber past the peripheral lips 43 of the arrangement. It will be readily understood that a quite small lifting of the spring disc 42 will open the continuous annular peripheral mouth of the arrangement 41, 42 sufficiently to permit a given volume of fluid spurting through the openings 37 to distribute itself throughout the entire circumference of the emitting arrangement, and the cross-section of the emission opening is greatly in excess of the cross-section of the initial valving openings. The velocity will therefore be correspondingly decreased and the level within the cavitation chamber will rise up and down during operation of the shock absorber without such turbulence as would promote foaming.

Occasionally there will be trapped some minute bubbles of air in the working chamber, and this is particularly true of a new shock absorber as it comes from the factory, and means must be provided for permitting such entrapped air bubbles to rise from the working chamber to the liquid level at the top of the cavitation chamber. Such means are provided by the present invention and comprise the minute grooves 50, four of these grooves probably being sufficient in the case of a shock absorber such as illustrated in the drawings. These grooves are formed at intervals around the bottom surface of the partition plate 18 and extend from certain of the openings 21 radially outwardly at least somewhat beyond the periphery of the spring valve 25. This permits the air bubbles to travel through the grooves or channels 50 into the valve openings 21 and thus upwardly to the top of the liquid level in the cavitation chamber. Thus, if the shock absorber has lain in horizontal position for any length of time and air has been trapped in the working chamber, the shock absorber may be held in a vertical position and the piston moved up and down a few strokes by hand and this will purge the air from the working chamber through the slots or grooves 50 and thus prevent the formation of emulsion from this source. It will be noted that foaming or emulsifying in an absorber will cause the shock absorber to lose efficiency and fade rapidly.

In Figure 3 of the drawings, the partition assembly B¹ includes a slightly modified form of cap is provided for retaining the spring disc member 42 in position relatively to the lower cup-like emission member 41. The central hollow stem is designated 22' and differs from the previously described stem 22 in the elimination of the threads at its upper portion and the provision of an annular groove 55 therein. The cap 28' corresponding in function to the cap 28 of the first embodiment is made of sheet metal and is staked as at 56 at points around its periphery to form inwardly directed protuberances that enter the groove 55.

In Figure 4 of the drawings another modification of the partition assembly is illustrated at B², in which the partition stem and valving elements are the same as in the first described embodiment and are given similar reference characters, but the velocity diminishing elements are of somewhat different configuration. The lower element 41 is substantially the same as in the earlier described embodiment and has the curved lip portion 43. However, the upper element 42', instead of being a simple flat disc as at 42 in the first described embodiments, is reversely cupped and has a shape substantially similar to the lower member 41, the margins also being provided with a lip 43a which defines the ejecting peripheral outlet between itself and the lower lip 43.

In all of the various embodiments of the invention a supply of substantially un-aerated liquid is confined in the sub-chamber 40 between the elements 41 and 42 and upon the compression stroke of the piston, fluid entering through the valved opening 30 and the lateral passages 37 with considerable force merely eject this solid fluid throughout the entire periphery of the chamber 40 and it emerges rather gently into the cavitation chamber as an annular sheet of liquid containing no air and of such reduced velocity that foaming or emulsification in the cavitation chamber is practically eliminated.

The described construction greatly facilitates the assembly of the shock absorber. After the cap 11 has been welded to the cylinder 10 the interior of the shell may be washed to remove any iron oxide resulting from the weld, before the partition assembly is inserted and secured. This has been very difficult or impossible in previous methods of assembly. In this case the washing is effected and then the partition assembly is forced into the cylinder until the plate 18 lodges securely against the upper projections 19. Then the lower projections 20 are formed immediately beneath the plate 18 by a staking process and thus the partition assembly is securely fixed in position.

It will be understood that various changes and modifications may be made in the embodiments illustrated and described herein without departing from the scope of the invention as defined by the following claims.

Having thus described the invention, what is claimed as new and desired to be secured by Letters Patent is:

1. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; an opening in said partition through which fluid from the working chamber is forced upon inward movement of the piston rod, and means affording reverse flow of fluid from said expansion chamber to said working chamber, upon recession of the piston rod; an axially disposed valve chamber above said opening, a spring pressed valve in said chamber controlling flow through said opening, laterally outwardly directed openings in the walls of said axial valve chamber, an annular sub-enclosure surrounding said valve chamber and terminating radially and short of the casing walls, whereby a considerable volume of said expansion chamber surrounds the sub-enclosure, adapted to receive displaced fluid from said laterally directed openings and discharge said fluid radially outwardly through substantially its entire periphery into said expansion chamber proper in increased volume but greatly diminished velocity, said sub-enclosure being effectuated by a single pair of discs spaced apart to receive fluid from said central opening, the outer margins of said discs defining a substantially continuous annular discharge orifice, and means for supporting said discs immediately adjacent the central portion of said partition on the expansion chamber side thereof.

2. The shock absorber according to claim 1 in which one of said discs is dished, the other being a thin flat spring element.

3. The shock absorber according to claim 1 in which both discs are dished and are provided with rounded peripheral lips adapted to come into tangential contact.

4. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; an axial opening in said partition, and means affording reverse flow of fluid from said expansion chamber to said working chamber, upon recession of the piston rod; a hollow post fixed in said opening and rising axially into said expansion chamber, said hollow post being closed at its upper end and having an opening in the lower end thereof through which fluid may flow from said working chamber upon entry of successive portions of the piston rod, the interior of said hollow post constituting a valve chamber, a valve in said valve chamber adapted to seat on the margins of said opening, a spring in said hollow post urging said valve toward its seat with predetermined resilient pressure, laterally outwardly directed openings in the side walls of said hollow post of greater cross-sectional area than that of said valved inlet opening, a pair of annular discs having their central openings surrounding said post respectively above and below said laterally directed openings, the outer peripheral margins of said discs cooperating to provide a substantially continuous annular discharge orifice of greater cross-sectional area than that of the laterally directed openings in said hollow post, said hollow post being closed at its upper end by means of a threaded cap, the annular margins of which embrace the upper portion of the post, project outwardly therefrom, and serve to confine the discs in their proper positions between said cap and said partition proper.

5. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; an axial opening in said partition, and means affording reverse flow of fluid from said expansion chamber to said working chamber, upon recession of the piston rod; a hollow post fixed in said opening and rising axially into said expansion chamber, said hollow post being closed at its upper end and having an opening in the lower end thereof through which fluid may flow from said working chamber upon entry of successive portions of the piston rod, the interior of said hollow post constituting a valve chamber, a valve in said valve chamber adapted to seat on the margins of said opening, a spring in said hollow post urging said valve toward its seat with predetermined resilent pressure, laterally outwardly directed openings in the side walls of said hollow post of greater cross-sectional area than that of said valved inlet opening, a pair of annular discs having their central openings surrounding said post respectively above and below said laterally directed openings, the outer peripheral margins of said discs cooperating to provide a substantially continuous annular discharge orifice of greater cross-sectional area than that of the laterally directed openings in said hollow post, said hollow post being closed at its upper end by a sheet metal cap crimped onto the post, the annular margins of which embrace the upper margin of the post, project outwardly therefrom, and serve to confine the discs in their proper positions between said cap and said partition proper.

References Cited in the file of this patent

UNITED STATES PATENTS

| | | |
|---|---|---|
| 2,471,294 | Watts | May 24, 1949 |
| 2,507,266 | Patriquin | May 9, 1950 |
| 2,565,617 | Mercier et al. | Aug. 28, 1951 |
| 2,593,372 | Watts | Apr. 15, 1952 |
| 2,596,982 | Chisholm | May 20, 1952 |
| 2,719,612 | De Previnqvieres | Oct. 4, 1955 |
| 2,757,762 | De Carbon | Aug. 7, 1956 |

FOREIGN PATENTS

| | | |
|---|---|---|
| 671,712 | Great Britain | May 7, 1952 |
| 677,857 | Great Britain | Aug. 20, 1952 |